(12) United States Patent
Madhani et al.

(10) Patent No.: US 8,399,819 B2
(45) Date of Patent: Mar. 19, 2013

(54) CURRENT SOURCE TO DRIVE A LIGHT SOURCE IN AN OPTICAL SENSOR SYSTEM

(75) Inventors: Vipin C. Madhani, Burlington, MA (US); Alan Adamsky, Newton, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 587 days.

(21) Appl. No.: 12/652,083

(22) Filed: Jan. 5, 2010

(65) Prior Publication Data
US 2010/0244795 A1 Sep. 30, 2010

Related U.S. Application Data

(60) Provisional application No. 61/165,171, filed on Mar. 31, 2009, provisional application No. 61/165,181, filed on Mar. 31, 2009, provisional application No. 61/165,388, filed on Mar. 31, 2009, provisional application No. 61/165,159, filed on Mar. 31, 2009.

(51) Int. Cl.
*G01J 1/32* (2006.01)
(52) U.S. Cl. ........................................ 250/205; 315/307
(58) Field of Classification Search .................. 250/204, 250/205; 345/46, 82, 102, 204; 315/194, 315/307
See application file for complete search history.

(56) References Cited

U.S. PATENT DOCUMENTS

| | | | | |
|---|---|---|---|---|
| 4,017,847 A | * | 4/1977 | Burford et al. ................... | 345/46 |
| 4,743,897 A | * | 5/1988 | Perez ............................ | 345/212 |
| 5,365,148 A | * | 11/1994 | Mallon et al. ................. | 315/194 |
| 7,202,641 B2 | | 4/2007 | Claessens et al. | |
| 2002/0047642 A1 | * | 4/2002 | Miyagawa ..................... | 315/307 |
| 2004/0090403 A1 | * | 5/2004 | Huang ............................ | 345/82 |
| 2004/0251854 A1 | | 12/2004 | Tomoaki et al. | |
| 2005/0134198 A1 | | 6/2005 | Crandall et al. | |
| 2005/0243022 A1 | * | 11/2005 | Negru ............................. | 345/46 |
| 2006/0038803 A1 | * | 2/2006 | Miller et al. ................... | 345/204 |
| 2007/0057936 A1 | * | 3/2007 | Lee et al. ....................... | 345/211 |
| 2008/0174929 A1 | | 7/2008 | Shen et al. | |
| 2008/0191642 A1 | | 8/2008 | Slot et al. | |
| 2009/0058323 A1 | | 3/2009 | Yang | |
| 2009/0079363 A1 | | 3/2009 | Ghoman et al. | |

FOREIGN PATENT DOCUMENTS

KR 10-2006-0130306 A 12/2006
WO 2004-057924 A1 7/2004

OTHER PUBLICATIONS

International Search Report, completed Sep. 16, 2010, pp. 1-3, Korean Intellectual Property Office, Daejeon, Republic of Korea.
Written Opinion of the International Searching Authority, completed Sep. 16, 2010, pp. 1-4, Korean Intellectual Property Office, Daejeon, Republic of Korea.

* cited by examiner

*Primary Examiner* — Seung C Sohn
(74) *Attorney, Agent, or Firm* — Shaun P. Montana; Andrew Martin

(57) ABSTRACT

A current source circuit to drive a light source in an optical sensor system is disclosed. The current source includes an inductor connected in series with a resistor, and a diode coupled in parallel with the inductor and resistor. The current source is configured to receive a regulated direct current (DC) voltage and to provide the current through the inductor to the light source when a switch is closed, and to divert current through the inductor to the diode when the switch is open.

17 Claims, 2 Drawing Sheets

CURRENT SOURCE TO DRIVE A LIGHT SOURCE IN AN OPTICAL SENSOR SYSTEM

CROSS-REFERENCE TO RELATED APPLICATIONS

This application claims priority from the following commonly owned U.S. Provisional Patent Application Ser. No. 61/165,171, Ser. No. 61/165,181, Ser. No. 61/165,388, and Ser. No. 61/165,159, all of which were filed on Mar. 31, 2009.

This application is related to the following commonly-owned applications: U.S. Utility patent application Ser. No. 12/652,087, entitled "DUAL VOLTAGE AND CURRENT CONTROL FEEDBACK LOOP FOR AN OPTICAL SENSOR SYSTEM"; U.S. Utility patent application Ser. No. 12/652,089, entitled "OPTICAL SENSOR SYSTEM INCLUDING SERIES CONNECTED LIGHT EMITTING DIODES"; and U.S. Utility patent application Ser. No. 12/652,095, entitled "HIGH VOLTAGE SUPPLY TO INCREASE RISE TIME OF CURRENT THROUGH LIGHT SOURCE IN AN OPTICAL SENSOR SYSTEM"; all filed on Jan. 5, 2010, and all of which are hereby incorporated by reference.

TECHNICAL FIELD

The present application relates to sensors and, more particularly, to a current source to drive a light source in an optical sensor system.

BACKGROUND

Optical sensor systems may be used to locate and/or image an object by detecting light reflected from the object. Such systems may include a light source that transmits light toward an object and a detector for detecting portions of the transmitted light reflected by the object. A characteristic of the reflected light may be analyzed by the sensor system to determine the distance to an object and/or to generate an electronic image of the object.

In one example, such a system may include a light source, such as one or more light emitting diodes (LEDs), configured to transmit modulated infrared light (IR), i.e. IR light that is rapidly turned on and off. The detector may receive the reflected light and calculate the phase shift imparted by reflection of the light back to the sensor. The time of flight of the received light may be calculated from the phase shift and distance to various points in the sensor field of view may be calculated by multiplying the time of flight and the velocity of the signal in the transmission medium. By providing an array of receiving pixels in the detector, the distance signals associated with light received at each pixel may be mapped to generate a three-dimensional electronic image of the field of view.

The manner of modulation of the light source in such systems is a factor in system performance. To achieve useful and accurate imaging, it is desirable to modulate the light source at a high frequency, e.g. 40 MHz. In addition, it is desirable in such systems to modulate the light source with high efficiency and reliability, while maintaining reasonable cost of manufacture and a relatively small package size.

SUMMARY

In an embodiment, there is provided a light source circuit for an optical sensor system. The light source circuit includes: a power supply to provide a regulated direct current (DC) voltage output; a current source coupled to the power supply to receive the regulated DC voltage output, wherein the current source includes: an inductor connected in series with a resistor; and a diode coupled in parallel with the inductor and resistor; a light source coupled to the current source; and a switch, whereby the current source is configured to provide current through the inductor to the light source when the switch is closed and divert current through the inductor to the diode when the switch is open.

In a related embodiment, the current source may further include a current monitor coupled to the resistor and configured to provide a feedback output to the power supply representative of current through the resistor. In another related embodiment, the power supply may be configured to adjust the regulated DC voltage output in response to the feedback output from the current monitor. In yet another related embodiment, the light source may include a plurality of series connected light emitting diodes. In still another related embodiment, the light source circuit may further include a drive circuit to open and close the switch at a predetermined frequency. In a further related embodiment, the predetermined frequency may be about 40 MHz.

In another embodiment, there is provided a current source circuit for providing current to a light source under the control of a switch in an optical sensor system. The circuit includes: an inductor connected in series with a resistor; and a diode coupled in parallel with the inductor and resistor; wherein the current source circuit is configured to receive a regulated direct current (DC) voltage from a power supply and to provide the current through the inductor to the light source when the switch is closed, and to divert current through the inductor to the diode when the switch is open. In a related embodiment, the current source circuit may further include a current monitor coupled to the resistor and configured to provide a feedback output to the power supply representative of current through the resistor.

In yet another embodiment, there is a provided an optical sensor system. The optical sensor system includes: a controller; a light source circuit coupled to the controller to drive a light source in response to control signals received from the controller, the light source circuit comprising: a power supply to provide a regulated direct current (DC) voltage output; a current source coupled to the power supply to receive the regulated DC voltage output, the current source comprising: an inductor connected in series with a resistor; and a diode coupled in parallel with the inductor and resistor; a light source coupled to the current source; and a switch, whereby the current source is configured to provide current through the inductor to the light source when the switch is closed, and divert current through the inductor to the diode when the switch is open; transmission optics to direct light from the light source toward an object; receiver optics to receive light reflected from the object; and detector circuits to convert the reflected light to one or more electrical signals; wherein the controller is configured to provide a data signal output representative of a distance to at least one point on the object in response to the one or more electrical signals.

In a related embodiment, the current source may further include a current monitor coupled to the resistor and configured to provide a feedback output to the power supply representative of current through the resistor. In another related embodiment, the power supply may be configured to adjust the regulated DC voltage output in response to the feedback output from the current monitor. In yet another related embodiment, the light source may include a plurality of series connected light emitting diodes. In yet still another related embodiment, the optical sensor system may further include a drive circuit to open and close the switch at a predetermined frequency. In a related embodiment, the predetermined frequency may be about 40 MHz.

In still another embodiment, there is provided a method of providing current to a light source under the control of a switch in an optical sensor system. The method includes providing the current through an inductor to the light source when the switch is closed; and diverting current through the inductor through a diode when the switch is open. In a related embodiment, the method may further include monitoring the current through the inductor when the switch is closed; and providing feedback to a power supply in response to the monitoring the current. In another related embodiment, the method may further include adjusting a voltage output of the power supply in response to the monitoring the current when the switch is closed.

BRIEF DESCRIPTION OF THE DRAWINGS

Objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
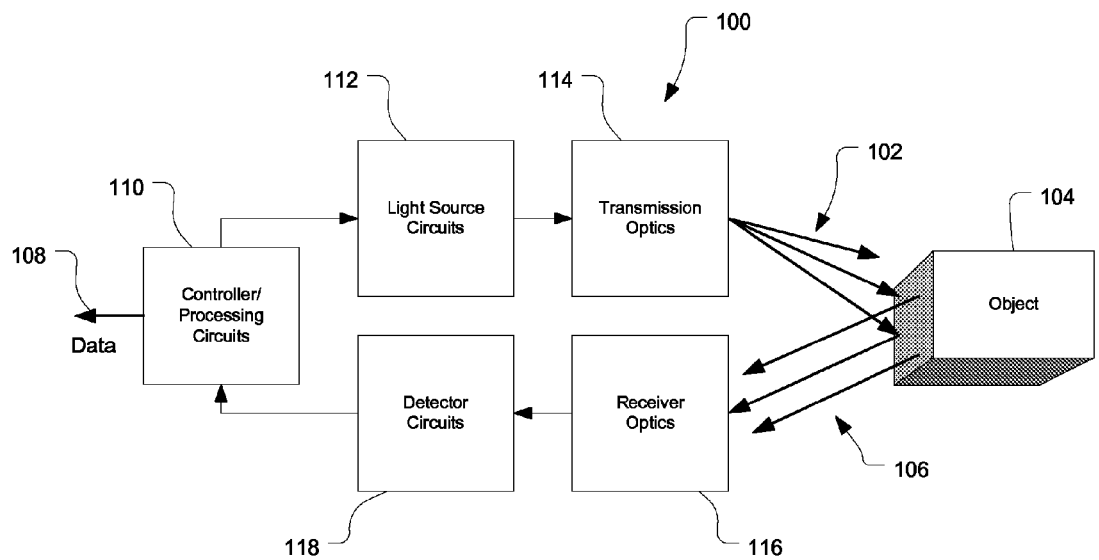
FIG. 1 is a block diagram of an optical sensor system according to embodiments described herein.

FIG. 1 is a simplified block diagram of an optical sensor system 100 according to embodiments disclosed herein. In general, the optical sensor system 100 emits light 102, e.g. infrared (IR) light, that is reflected by an object 104, and receives the reflected light 106 to identify the distance to the object 104 and/or to map an image of the object 104. In some embodiments, for example, the system may be implemented as a collision avoidance sensor, e.g. a back-up sensor, for an automotive vehicle. In a back-up sensor application, for example, the system provides a data output 108 indicating distance from the rear of the vehicle to an object 104 for assisting a driver of the vehicle in avoiding inadvertent contact with the object 104 when moving in reverse. Although systems and methods consistent with the present disclosure may be described in connection with a particular application, those of ordinary skill in the art will recognize that a wide variety of applications are possible. For example, systems and methods consistent with the present disclosure may be implemented in optical sensors for range finding applications, or any application involving identification and/or imaging of a target object.

Those of ordinary skill in the art will recognize that the optical sensor system 100 has been depicted in highly simplified form for ease of explanation. The optical sensor system 100 shown in FIG. 1 includes controller/processing circuits 110, light source circuits 112, transmission optics 114, receiver optics 116 and detector circuits 118. The controller/processing circuits 110 may be known circuits for controlling modulation of a light source of the light source circuits and for processing received data to generate an output data stream representative of the distance from the sensor to the object and/or an electronic image of the object. Controller/processing circuits 110 may, for example, be any of the depth sensor controller/processing circuits commercially available from Canesta, Inc. of Sunnyvale, Calif.

The light source circuits 112 may include known circuitry for driving the light source in response to control outputs from the controller/processing circuits 110, and may include circuitry consistent with the present disclosure. The transmission optics 114 may include known optical components for directing light output from the light source to provide a system field of view encompassing the object(s) of interest. The receiver optics 116 may include known optical components for receiving light reflected from the object of interest and directing the received light to the detector circuits 118. The detector circuits 118 may include known light detectors, e.g. arranged in an array of pixels, for converting the received light into electrical signals provided to the control/processing circuits 110. The detector circuits 118 may, for example, be any of the detector circuits commercially available from Canesta, Inc. of Sunnyvale, Calif. The control processing circuits 110 may calculate distance to various points on the object and within the system field of view, e.g. using phase shift in the received light to calculate time of flight and distance, to provide the data output indicating distance to the object and/or mapping the object to provide a three-dimensional image thereof.

Figure 2:
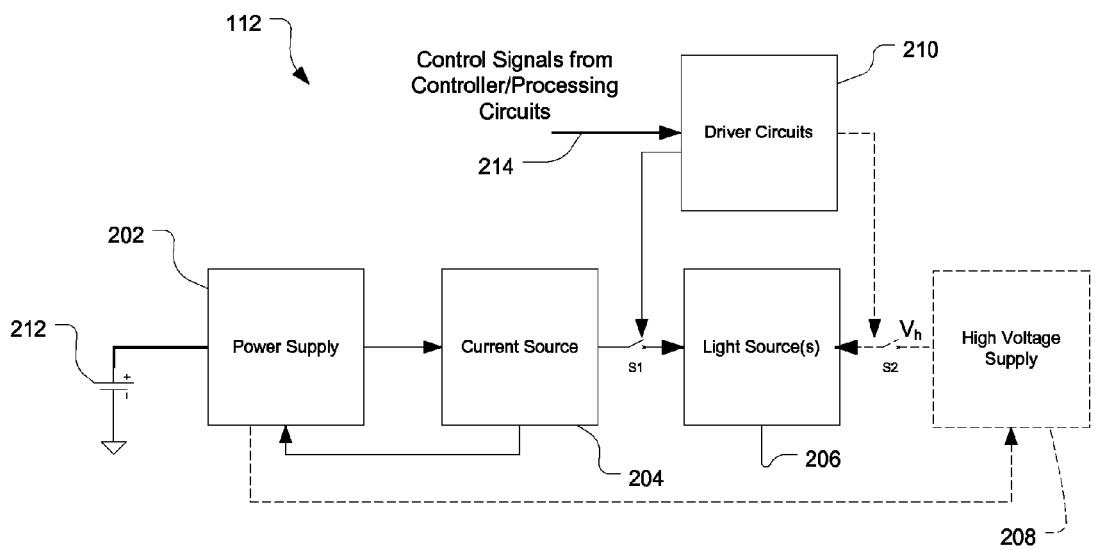
FIG. 2 is a block diagram of optical sensor system light source circuits according to embodiments described herein.

FIG. 2 is a simplified block diagram of the light source circuits 112 according to embodiments described herein. The light source circuits 112 include a power supply 202, a current source 204 coupled to the output of the power supply 202, one or more light sources 206 coupled to the current source 204, an optional high voltage supply 208 coupled to the current source 204, and driver circuits 210 for controlling switches S1 and S2 to turn the one or more light sources 206 off and on at a predetermined frequency, i.e. modulate the one or more light sources 206. The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. The driver circuits 210 may take one of any known configuration or configuration described herein.

The power supply 202 may take any known configuration for receiving an input voltage from an input voltage source 212 and providing a regulated direct current (DC) voltage output. For example, the input voltage source 212 may be, and in FIG. 2 is, a DC source, e.g. a vehicle battery, and the power supply 202 may be, and in FIG. 2 is, a known DC-DC converter for converting the DC source voltage to a regulated DC voltage at the output of the power supply 202. Known DC-DC converters include, for example, buck converters, boost converters, single ended primary inductor converter (SEPIC), etc. In some embodiments, a SEPIC converter may be used to allow a regulated DC output voltage that is greater than, less than, or equal to the input voltage. SEPIC converter and SEPIC converter controller configurations are well-known to those of ordinary skill in the art. One SEPIC converter controller useful in connection a system consistent with the present disclosure is commercially available from Linear Technology Corporation, as model number LTC1871®. Those of ordinary skill in the art will recognize that an alternating current (AC) input may alternatively be used and that the power supply 202 may then include a known AC-DC converter for providing a regulated DC output voltage.

The current source 204 may provide a constant current to the one or more light sources 206 for energizing the one or more light sources 206 when the switch S1 is closed by the driver circuits 210. The switch S1 is illustrated in diagrammatic form for ease of explanation, but may take the form of any of a variety of configurations known to those of ordinary skill in the art. For example, the switch S1 may be a transistor configuration that conducts current under the control of the driver circuit output.

The driver circuits 210 may be configured to open and close the switch S1 at a predetermined frequency under the control of control signals 214 from the controller/processing circuits 110. In some embodiments, for example, the driver circuits 210 may open and close the switch S1 at a frequency of about 40 MHz. The current source 204 may thus provide a driving current to the one or more light sources 206 at the predetermined frequency for modulating the one or more light sources 206, i.e. turning the one or more light sources 206 on and off.

The optional high voltage supply 208 may be coupled to the one or more light sources 206 through the switch S2. The switch S2 may be closed by the driver circuits 210 under the control of control signals from the controller/processing circuits 110 during the start of the "on" time for the one or more light sources 206. The optional high voltage supply 208 may thus increase the voltage across the one or more light sources 206 to a voltage higher than can be established by the current source 204 to decrease the rise time of the current through the one or more light sources 206. After the start of the "on" time for the one or more light sources 206, the switch S2 may open to disconnect the optional high voltage supply 208 from the one or more light sources 206, and the current source 204 may drive the one or more light sources 206 through the rest of the "on" time.

The switch S2 is illustrated in diagrammatic form for ease of explanation, but may take the any of a variety of configurations known to those of ordinary skill in the art. For example, the switch S2 may be a transistor configuration that conducts current under the control of an output of the driver circuits 210. In addition, the switch S2 may be incorporated into the optional high voltage supply 208 or be separate therefrom.

Figure 3:
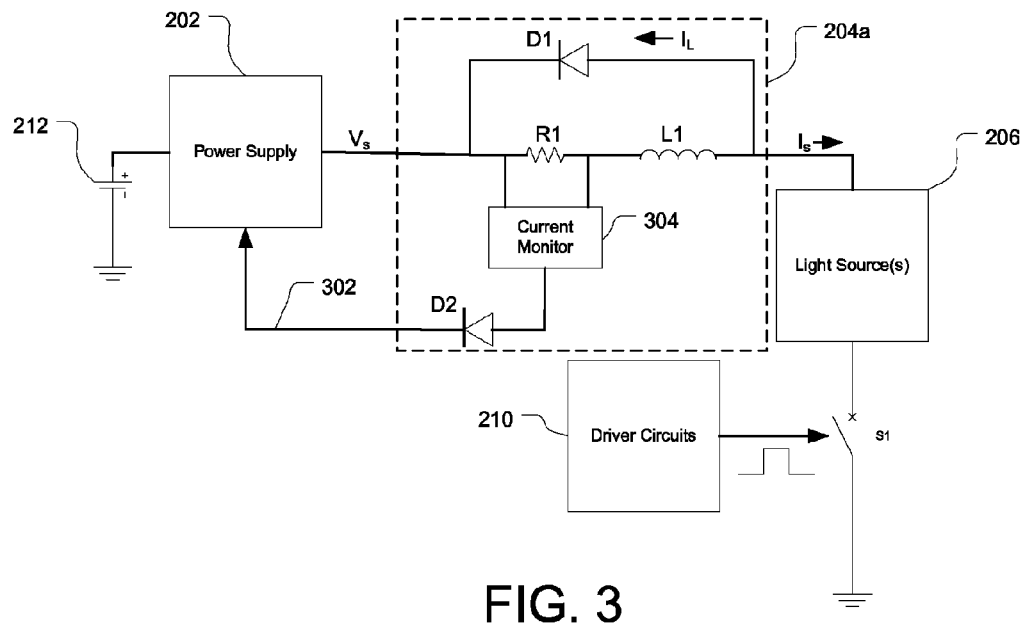
FIG. 3 is a block diagram of optical sensor system light source circuits including a current source according to embodiments described herein.

FIG. 3 illustrates one exemplary embodiment of a clamped inductor current source 204a consistent with the present disclosure. As shown in FIG. 3, the clamped inductor current source 204a includes a resistor R1 in series with an inductor L1, and a diode D1 coupled in parallel across the series combination of the resistor R1 and the inductor L1. A feedback path 302 to the power supply 202 is provided by a current monitor 304 and a diode D2.

As shown, the regulated DC output $V_s$ of the power supply 202 may be coupled to the input of the clamped inductor current source 204a at the resistor R1. The driver circuits 210 may open and close the switch S1 at a high frequency, e.g. 40 MHz. When the switch S1 is closed, a current $I_s$ flows through the series combination of the resistor R1 and the inductor L1 and to the one or more light sources 206 for energizing the one or more light sources 206. The inductor L1 thus establishes a constant current source and limits the current $I_s$ through the one or more light sources 206 when the switch S1 is closed. When the switch S1 is open, however, no current flows through the one or more light sources 206, and a current $I_L$ through the inductor L1 is diverted through the diode D1 to maintain current through the inductor L1.

As shown, the current monitor 304 may be coupled across the resistor R1 for sensing the voltage drop across the resistor R1. The current monitor 304 may take any configuration known to those of ordinary skill in the art. In some embodiments, for example, the current monitor 304 may be configured using a current shunt monitor available from Texas Instruments® under model number INA138. The current monitor 304 may provide a feedback output to the power supply 202, e.g. through the diode D2.

In response to the feedback from the current monitor 304 and during the time when the switch S1 is closed, the power supply 202 may be configured to adjust the supply voltage $V_s$ to a voltage that will allow the inductor L1 to recharge. In some embodiments, the feedback path 302 may be coupled to a voltage feedback path of the power supply 202 to provide a constant current control loop that takes control away from the voltage control loop during the time when the switch S1 is closed, i.e. the light source/sources "on" time. A variety of configurations for providing an adjustable supply voltage in response to the current monitor feedback are well-known to those of ordinary skill the art. In some embodiments, for example, the power supply 202 may be configured using a known converter, e.g. a SEPIC converter, and a known converter controller, e.g. a SEPIC controller, configured to control the converter output in response to the current monitor feedback.

Figure 4:
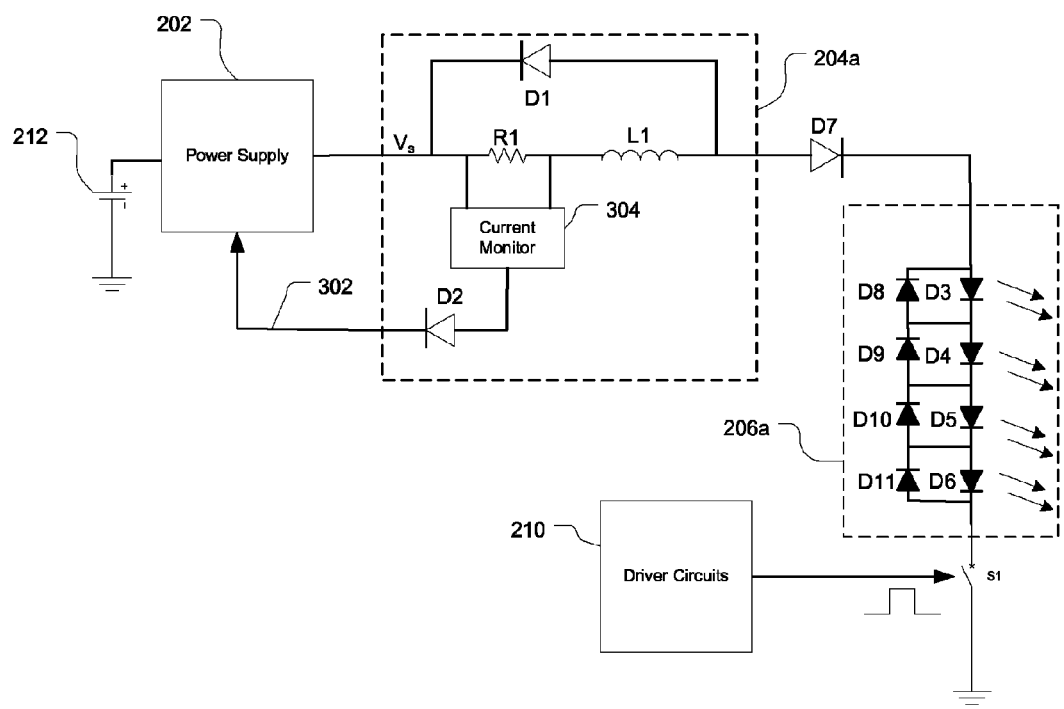
FIG. 4 is a block diagram of optical sensor system light source circuits including a current source to drive a light source including a plurality of series connected LEDs according to embodiments described herein.

A constant current may thus be established through the inductor L1 when the switch S1 is closed, i.e. when the one or more light sources is/are "on" and emitting light. As shown in FIG. 4, a current source 204a consistent with the present disclosure may be implemented in a system wherein a light source 206a includes a plurality of infrared light-emitting diodes (LEDs) D3, D4, D5, and D6 connected in series. Although, as shown in FIG. 4, there are four series connected LEDs D3, D4, D5, and D6, it is to be understood that any number of LEDs may be connected in series to provide a light source consistent with the present disclosure. As shown in FIG. 4, driving current from the current source 204a is provided to the plurality of infrared LEDs D3, D5, D5, and D6 through a diode D7, and diodes D8, D9, D10, D11 are coupled across the plurality of infrared LEDs D3, D4, D5, and D6, respectively, to take up any back voltage across the series connected plurality of infrared LEDs D3, D4, D5, and D6. The current source 204a may thus provide constant current through the series connected plurality of infrared LEDs D3, D4, D5, and D6 to allow switching/modulation of the LED output at relatively high frequency, e.g. 40 MHz. Connecting the plurality of infrared LEDs D3, D4, D5, and D6 in series avoids phase differences between LED outputs and provides cost efficiency.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A light source circuit for an optical sensor system, the circuit comprising:
   a power supply to provide a regulated direct current (DC) voltage output;
   a current source coupled to the power supply to receive the regulated DC voltage output, wherein the current source comprises:
      an inductor connected in series with a resistor; and
      a diode coupled in parallel with the inductor and resistor;
   a light source coupled to the current source; and
   a switch, whereby the current source is configured to provide current through the inductor to the light source when the switch is closed and the current source is configured to provide current through the inductor to the diode when the switch is open.

2. The light source circuit according to claim 1, wherein the current source further comprises a current monitor coupled to the resistor and configured to provide a feedback output to the power supply representative of current through the resistor.

3. The light source circuit according to claim 1, wherein the power supply is configured to adjust the regulated DC voltage output in response to the feedback output from the current monitor.

4. The light source circuit according to claim 1, wherein the light source comprises a plurality of series connected light emitting diodes.

5. The light source circuit according to claim 1, further comprising a drive circuit to open and close the switch at a predetermined frequency.

6. The light source circuit according to claim 5, wherein the predetermined frequency is about 40 MHz.

7. A current source circuit for providing current to a light source under the control of a switch in an optical sensor system, the circuit comprising:
   an inductor connected in series with a resistor; and
   a diode coupled in parallel with the inductor and resistor and in series with the light source;
   wherein the current source circuit is configured to receive a regulated direct current (DC) voltage from a power supply and to provide the current through the inductor to the light source when the switch is closed, and to divert current through the inductor to the diode when the switch is open.

8. The current source circuit according to claim 7, wherein the current source circuit further comprises a current monitor coupled to the resistor and configured to provide a feedback output to the power supply representative of current through the resistor.

9. An optical sensor system comprising:
   a controller;
   a light source circuit coupled to the controller to drive a light source in response to control signals received from the controller, the light source circuit comprising:
      a power supply to provide a regulated direct current (DC) voltage output;
      a current source coupled to the power supply to receive the regulated DC voltage output, the current source comprising:
         an inductor connected in series with a resistor; and
         a diode coupled in parallel with the inductor and resistor and in series with the light source circuit;
      a light source coupled to the current source; and
      a switch, whereby the current source is configured to provide current through the inductor to the light source when the switch is closed, and the current source is configured to provide current through the inductor to the diode when the switch is open;
   transmission optics to direct light from the light source toward an object;
   receiver optics to receive light reflected from the object; and
   detector circuits to convert the reflected light to one or more electrical signals;
   wherein the controller is configured to provide a data signal output representative of a distance to at least one point on the object in response to the one or more electrical signals.

10. The optical sensor system according to claim 9, wherein the current source further comprises a current monitor coupled to the resistor and configured to provide a feedback output to the power supply representative of current through the resistor.

11. The optical sensor system according to claim 9, wherein the power supply is configured to adjust the regulated DC voltage output in response to the feedback output from the current monitor.

12. The optical sensor system according to claim 9, wherein the light source comprises a plurality of series connected light emitting diodes.

13. The optical sensor system according to claim 9, wherein the system further comprises a drive circuit to open and close the switch at a predetermined frequency.

14. The optical sensor system according to claim 13, wherein the predetermined frequency is about 40 MHz.

15. A method of providing current to a light source under the control of a switch in an optical sensor system, the method comprising:
   providing the current through an inductor to the light source when the switch is closed; and
   providing current from a current source through the inductor through a diode when the switch is open.

16. The method according to claim 15, the method further comprising:
   monitoring the current through the inductor when the switch is closed; and
   providing feedback to a power supply in response to the monitoring the current.

17. The method according to claim 15, the method further comprising:
   adjusting a voltage output of the power supply in response to the monitoring the current when the switch is closed.

* * * * *